US012707175B2

(12) United States Patent
Bankapur et al.

(10) Patent No.: US 12,707,175 B2
(45) Date of Patent: Aug. 11, 2026

(54) METHOD AND SYSTEM FOR ADVERTISING SRLG INFORMATION BETWEEN MULTIPLE LAYERS OF COMMUNICATION NETWORK

(71) Applicant: Rakuten Symphony, Inc., Tokyo (JP)

(72) Inventors: Ayajahamad Bankapur, Indore (IN); Amit Dhamija, Indore (IN); Praveen Kumar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 616 days.

(21) Appl. No.: 18/024,321

(22) PCT Filed: Feb. 2, 2023

(86) PCT No.: PCT/US2023/012177
§ 371 (c)(1),
(2) Date: Mar. 2, 2023

(87) PCT Pub. No.: WO2024/072478
PCT Pub. Date: Apr. 4, 2024

(65) Prior Publication Data

US 2024/0314474 A1 Sep. 19, 2024

(30) Foreign Application Priority Data

Sep. 30, 2022 (IN) ............................ 202241056284

(51) Int. Cl.
*H04Q 11/00* (2006.01)
*H04L 45/02* (2022.01)
(Continued)

(52) U.S. Cl.
CPC ......... *H04Q 11/0062* (2013.01); *H04L 45/04* (2013.01); *H04L 69/18* (2013.01);
(Continued)

(58) Field of Classification Search
CPC ....... H04Q 11/0062; H04Q 2011/0073; H04Q 2011/0086; H04Q 2011/0088;
(Continued)

(56) References Cited

U.S. PATENT DOCUMENTS 7,577,099 B1 * 8/2009 Greenberg ........... H04Q 3/0075 370/242
2014/0258486 A1 * 9/2014 Filsfils .................... H04L 45/22 709/223
(Continued)

FOREIGN PATENT DOCUMENTS

WO 2018/090716 A1 5/2018

OTHER PUBLICATIONS

International Search Report dated Jul. 27, 2023, issued in International Application No. PCT/US2023/012177.
(Continued)

*Primary Examiner* — Dibson J Sanchez
(74) *Attorney, Agent, or Firm* — Sughrue Mion, PLLC

(57) ABSTRACT

Embodiment herein provides a method for advertising Shared Risk Link Group (SRLG) information between multiple layers of a communication network. The method includes determining, by an optical domain controller (100), SRLG information associated with an optical domain and IP domain to be shared with an IP domain controller (200) and determining, by the optical domain controller (100), layer identifiers to establish a multi-protocol enabled Border Gateway Protocol (BGP) session between the optical domain and the IP domain. The method also includes establishing, by the optical domain controller (100), the multi-protocol enabled BGP session between the optical domain controller (100) and the IP domain controller (200) based on the layer identifiers; and advertising, by the optical domain controller (100), the SRLG information associated with the optical
(Continued)

domain and the SRLG information associated with the IP domain to the IP domain controller (200) over the established multi-protocol enabled BGP session.

23 Claims, 8 Drawing Sheets

(51) Int. Cl.
*H04L 69/18* (2022.01)
*H04B 10/03* (2013.01)

(52) U.S. Cl.
CPC ...... *H04B 10/03* (2013.01); *H04Q 2011/0073* (2013.01); *H04Q 2011/0081* (2013.01)

(58) Field of Classification Search
CPC . H04Q 2011/0081; H04L 45/04; H04L 69/18; H04L 12/4675; H04L 12/66; H04B 10/03
USPC .................................... 398/43–103, 115–117
See application file for complete search history.

(56) References Cited

U.S. PATENT DOCUMENTS

| | | | | |
|---|---|---|---|---|
| 2015/0010301 | A1* | 1/2015 | Previdi | H04B 10/27 370/254 |
| 2018/0220210 | A1 | 8/2018 | Paraschis et al. | |
| 2020/0336405 | A1* | 10/2020 | Xia | H04L 45/04 |
| 2020/0403907 | A1* | 12/2020 | Che | H04L 41/40 |
| 2021/0111944 | A1* | 4/2021 | Kuwabara | H04L 45/24 |
| 2022/0038798 | A1* | 2/2022 | Zhang | H04J 14/0295 |
| 2022/0124027 | A1* | 4/2022 | Du | H04L 45/34 |
| 2023/0269176 | A1* | 8/2023 | Padi | H04L 41/0893 709/238 |
| 2024/0314474 | A1* | 9/2024 | Bankapur | H04Q 11/0062 |

OTHER PUBLICATIONS

Written Opinion dated Jul. 27, 2023, issued in International Application No. PCT/US2023/012177.

* cited by examiner

METHOD AND SYSTEM FOR ADVERTISING SRLG INFORMATION BETWEEN MULTIPLE LAYERS OF COMMUNICATION NETWORK

CROSS-REFERENCE TO RELATED APPLICATION

This application is a National Stage of International Application No. PCT/US2023/012177 filed on Feb. 2, 2023, claiming priority based on Indian Application No. 202241056284, filed on Sep. 30, 2022, the disclosure of which is incorporated herein by reference in its entirety.

FIELD OF INVENTION

The present invention relates to communication network and more specifically related to a method and system for advertising shared Risk Link Group (SRLG) information between multiple layers of communication network.

BACKGROUND

In general, SRLG information is generally propagated from an optical layer i.e., L0/L1 layer to an internet protocol (IP) layer i.e., L3 layer of a transport domain through a manual process. In the transport domain, the optical layer and the IP layer act independently of each other. Each of the optical layer and the IP layer are managed by administrators who coordinate with each other to share and configure SRLG information. Further, the configured SRLG information is passed to an IP domain controller which decides on further computations based on the configured SRLG information. SRLG information includes data links which are routed through same fiber path and causes multiple outages during scenarios such as for example a fiber cut.

Therefore, it is essential to define the SRLG information in both the layers. However, if telecommunication operators managing the optical layer and the IP layer are not the same there can be coordination issues due to which the SRLG information may not be configured efficiently leading to diversity issues eventually impacting user experience. Also, the manual sharing of the SRLG information provides scope for human error, time lapse which reduces the efficiency of communication network. Thus, it is desired to address the aforementioned disadvantages or other shortcomings or at least provide a useful alternative.

OBJECT OF INVENTION

The principal object of the embodiments herein is to provide a method and system for advertising Shared Risk Link Group (SRLG) information between multiple layers of a communication network. The proposed method includes automatic detection and advertising of the SRLG information from optical domain layer (L1/L0) to IP domain (L3) layers in transport domain. Therefore, the proposed method automates the process thereby making it faster, efficient and resource effective with reduction in possible human errors.

SUMMARY

Accordingly, the embodiment herein is to provide a method for advertising Shared Risk Link Group (SRLG) information between multiple layers of a communication network. The method includes determining, by an optical domain controller, SRLG information associated with an optical domain and SRLG information associated with IP domain to be shared with a IP domain controller and determining, by the optical domain controller, layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain. The method also includes establishing, by the optical domain controller, the multi-protocol enabled BGP session between the optical domain controller and the IP domain controller based on the layer identifiers and advertising, by the optical domain controller, the SRLG information associated with the optical domain and the SRLG information associated with the IP domain to the IP domain controller over the established multi-protocol enabled BGP session.

In an embodiment, the method further includes receiving, by the IP domain controller, the SRLG information associated with the optical domain and the SRLG information associated with the IP domain over the established multi-protocol enabled BGP session and creating, by the IP domain controller, a SRLG-specific database locally. The method also includes storing, by the IP domain controller, the received SRLG information associated with the optical domain and the SRLG information associated with the IP domain in the SRLG-specific database; and performing, by the IP domain controller, at least one of a path computation and a path updation using at least one of the SRLG information associated with the optical domain and the SRLG information associated with the IP domain stored in the SRLG-specific database.

In an embodiment, establishing, by the optical domain controller, the multi-protocol enabled BGP session between the optical domain controller and the IP domain controller based on the request to the IP domain controller includes sending, by the optical domain controller, a request comprising the layer identifiers, to the IP domain controller for establishing the multi-protocol enabled BGP session between the optical domain controller and the IP domain controller and receiving, by the optical domain controller, a response accepting the establishment of the multi-protocol enabled BGP session between the optical domain controller (100) and the IP domain controller. The method also includes exchanging, by the optical domain controller, capabilities associated with the multi-protocol enabled BGP session with the IP domain controller and establishing, by the optical domain controller, the multi-protocol enabled BGP session between the optical domain controller and the IP domain controller.

In an embodiment, the SRLG information associated with the optical domain comprises at least one of a SRLG number associated with the optical domain, information of UNI interfaces.

In an embodiment, the SRLG information associated with the IP domain comprises information associated with IP domain router interface, router identifier (ID) discovered using a neighbour exchange protocol, link aggregation, virtual local area network identifier (VLAN ID) and VLAN details.

In an embodiment, the layer identifiers are at least one of Address Family Identifiers (AFI) and Subsequent Address Family Identifiers (SAFI).

Accordingly, the embodiments herein provide a system for advertising Shared Risk Link Group (SRLG) information between multiple layers of a communication network. The system includes an optical domain controller for an optical domain and an IP domain controller for an IP domain. The optical domain controller is configured to: determine SRLG information associated with an optical domain and SRLG information associated with IP domain to be shared with an IP domain controller and determine layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain. The optical domain controller is also configured to establish the multi-protocol enabled BGP session between the optical domain controller and the IP domain controller based on the layer identifiers; and advertise the SRLG information associated with the optical domain and the SRLG information associated with the IP domain to the IP domain controller over the established multi-protocol enabled BGP session.

Accordingly, the embodiments herein provide an optical domain controller for advertising Shared Risk Link Group (SRLG) information between multiple layers of a communication network. The optical domain controller includes a memory, a processor, a communicator and an optical domain SRLG manager. The optical domain SRLG manager is configured to determine SRLG information associated with an optical domain and SRLG information associated with IP domain to be shared with an IP domain controller and determine layer identifiers to establish a multi-protocol enabled Border Gateway Protocol (BGP) session between the optical domain and the IP domain. The layer identifiers indicate the advertising of the SRLG information associated with the optical domain and the SRLG information associated with the IP domain. The optical domain SRLG manager is configured to establish the multi-protocol enabled BGP session between the optical domain controller and the IP domain controller based on the layer identifiers; and advertise the SRLG information associated with the optical domain and the SRLG information associated with the IP domain to the IP domain controller over the established multi-protocol enabled BGP session.

Accordingly, the embodiments herein provide an IP domain controller for advertising Shared Risk Link Group (SRLG) information between multiple layers of a communication network. The IP domain controller includes a memory, a processor, a communicator and an IP domain SRLG manager. The IP domain SRLG manager is configured to accept a multi-protocol enabled BGP session between an optical domain controller and the IP domain controller and receive SRLG information associated with an optical domain and SRLG information associated with an IP domain from the optical domain controller over the established multi-protocol enabled BGP session. The IP domain SRLG manager is configured to create a SRLG-specific database locally; store the received SRLG information associated with the optical domain and the SRLG information associated with the IP domain in the SRLG-specific database; and perform at least one of a path computation and a path updation using at least one of the SRLG information associated with the optical domain and the SRLG information associated with the IP domain stored in the SRLG-specific database.

Accordingly, the embodiments herein provide a computer program product (CPP) for advertising Shared Risk Link Group (SRLG) information between multiple layers of a communication network. The CPP includes a computer executable program code recorded on a computer readable non-transitory storage medium, where said computer executable program code when executed causing the actions including: determining SRLG information associated with an optical domain and SRLG information associated with IP domain to be shared with an IP domain controller and determining layer identifiers to establish a multi-protocol enabled Border Gateway Protocol (BGP) session between the optical domain and the IP domain. The layer identifiers indicate the advertising of the SRLG information associated with the optical domain and the SRLG information associated with the IP domain. The CPP also includes establishing the multi-protocol enabled BGP session between the optical domain controller and the IP domain controller based on the layer identifiers; and advertising the SRLG information associated with the optical domain and the SRLG information associated with the IP domain to the IP domain controller over the established multi-protocol enabled BGP session.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
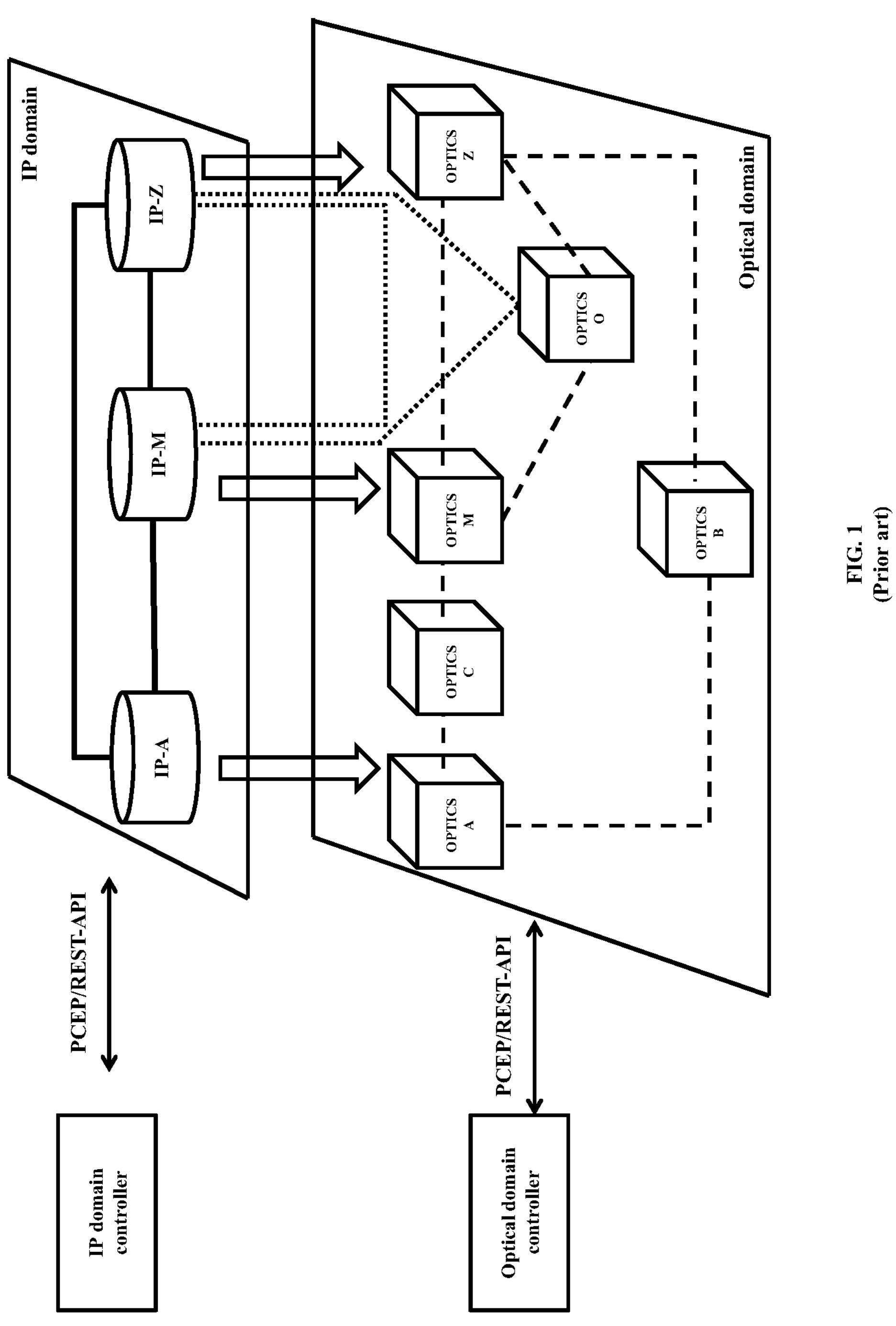
FIG. 1 illustrates a comprehensive view of an Optical layer and an internet protocol (IP) layer of a transport domain, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for advertising Shared Risk Link Group (SRLG) information between multiple layers of a communication network. The method includes determining, by an optical domain controller, SRLG information associated with an optical domain and SRLG information associated with IP domain to be shared with a IP domain controller and determining, by the optical domain controller, layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain. The method also includes establishing, by the optical domain controller, the multi-protocol enabled BGP session between the optical domain controller and the IP domain controller based on the layer identifiers and advertising, by the optical domain controller, the SRLG information associated with the optical domain and the SRLG information associated with the IP domain to the IP domain controller over the established multi-protocol enabled BGP session.

Accordingly, the embodiments herein provide an IP domain controller for advertising Shared Risk Link Group (SRLG) information between multiple layers of a communication network. The IP domain controller includes a memory, a processor, a communicator and a SRLG manager. The SRLG manager is configured to accept a multi-protocol enabled BGP session between an optical domain controller and the IP domain controller and receive SRLG information associated with an optical domain and SRLG information associated with an IP domain from the optical domain controller over the established multi-protocol enabled BGP session. The SRLG manager is configured to create a SRLG-specific database locally; store the received SRLG information associated with the optical domain and the SRLG information associated with the IP domain in the SRLG-specific database; and perform at least one of a path computation and a path updation using at least one of the SRLG information associated with the optical domain and the SRLG information associated with the IP domain stored in the SRLG-specific database.

Accordingly, the embodiments herein provide a computer program product (CPP) for advertising Shared Risk Link Group (SRLG) information between multiple layers of a communication network. The CPP includes a computer executable program code recorded on a computer readable non-transitory storage medium, where said computer executable program code when executed causing the actions including: determining SRLG information associated with an optical domain and SRLG information associated with IP domain to be shared with an IP domain controller and determining layer identifiers to establish a multi-protocol enabled Border Gateway Protocol (BGP) session between the optical domain and the IP domain. The layer identifiers indicate the advertising of the SRLG information associated with the optical domain and the SRLG information associated with the IP domain. The CPP also includes establishing the multi-protocol enabled BGP session between the optical domain controller and the IP domain controller based on the layer identifiers; and advertising the SRLG information associated with the optical domain and the SRLG information associated with the IP domain to the IP domain controller over the established multi-protocol enabled BGP session.

In conventional methods and systems, the SRLG information from the optical domain (L0/L1) is manually fed into the IP domain (L3). This takes a lot of human resource and can lead to synchronization errors. Unlike to the conventional methods and systems, the proposed method includes the automatic synchronization of the SRLG information between cross-domain.

In conventional methods and systems, the manual configuration of the SRLG information at the IP domain can result in human error, time lapse which reduces the efficiency of communication network.

Unlike to the conventional methods and systems, the proposed method includes using specific AFI and SAFI values for indicating SRLG information in the MP BGP protocol which automates the process of advertising the SRLG information between the layers.

Referring now to the drawings and more particularly to FIGS. 1 through 8, where similar reference characters denote corresponding features consistently throughout the figures, there are shown preferred embodiments.

FIG. 1 illustrates a comprehensive view of an Optical layer and an internet protocol (IP) layer of a transport domain, according to a prior art.

Referring to the FIG. 1, in the existing Network architecture, an IP layer i.e., a layer 3 (Router links) are established using service from an optical layer i.e., layer 1. The layer 3 network-to-network interface (NNI) link is a service (UNI link) in the Layer 1. In Software-defined networking (SDN) era, an optical domain controller and an IP domain controller is used to define paths in the optical layer and the IP layer respectively.

When two links share a common fiber path, then the two links are part of a SRLG. SRLG information is important in the transport domain for providing various services such for example but not limited to a scenario of dis-joint path management during fiber cut, etc. The SRLG information is generally propagated from the optical layer i.e., L0/L1 layer to the IP layer i.e., L3 layer through a manual process where the optical layer and the IP layer act independently of each other. Each of the optical layer and the IP layer are managed by administrators who coordinate with each other to share and configure the SRLG information. Further, the configured SRLG information is passed to the IP domain controller which decides on further computations based on the configured SRLG information. However, if network operators managing the optical layer and the IP layer are not the same there can be coordination issues due to which the SRLG information may not be configured efficiently leading to diversity issues eventually impacting user experience. Also, the manual sharing of the SRLG information provides scope for human error, time lapse and synchronization issues which reduces the efficiency of the communication network.

Figure 2:
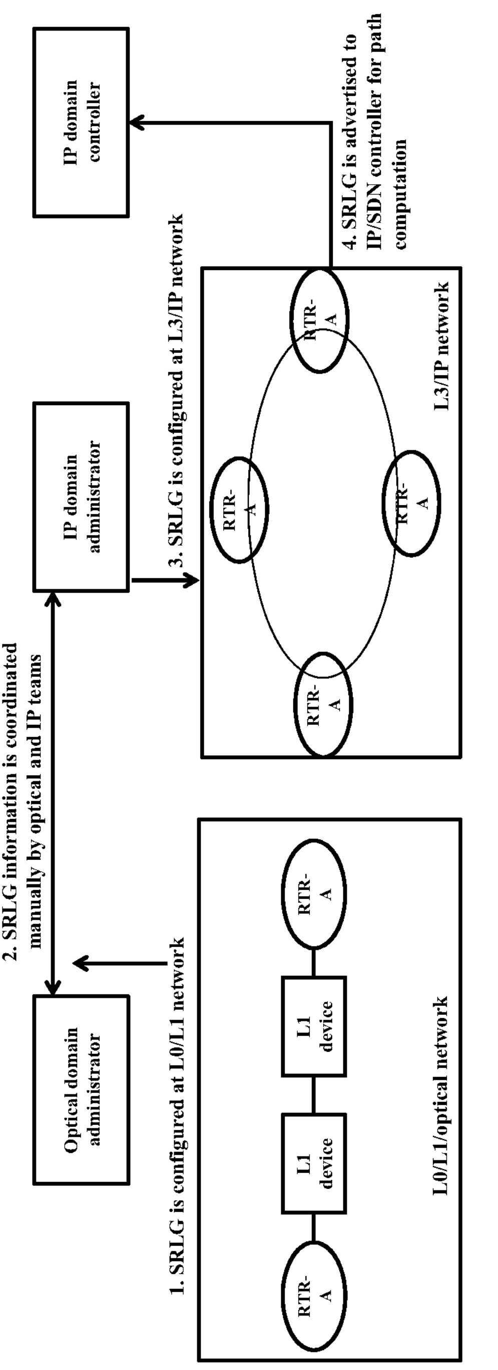
FIG. 2 illustrates a manual exchange of SRLG information between the Optical layer and the IP layer of the transport domain, according to a prior art.

FIG. 2 illustrates a manual exchange of the SRLG information between the optical layer and the IP layer of the transport domain, according to a prior art.

Referring to the FIG. 2, the existing mechanism of sharing the SRLG information manually is described. At step 1, the SRLG information is configured at the L0/L1 network at the optical layer. At step 2, the SRLG information is coordinated manually by an optical domain administrator and an IP domain administrator between the optical layer and the IP layer respectively. Further, at step 3, the IP domain administrator configures the SRLG information received from the optical domain administrator is configured at L3/IP network at the IP layer of the transport domain. At step 4, the SRLG is then advertised to IP/SDN controller for path computation.

However, the existing method of manually configuring the SRLG information at the IP domain can lead to human errors, time lapse or synchronization issues between the optical domain and the IP domain which reduces the efficiency of the communication network.

Figure 3A:
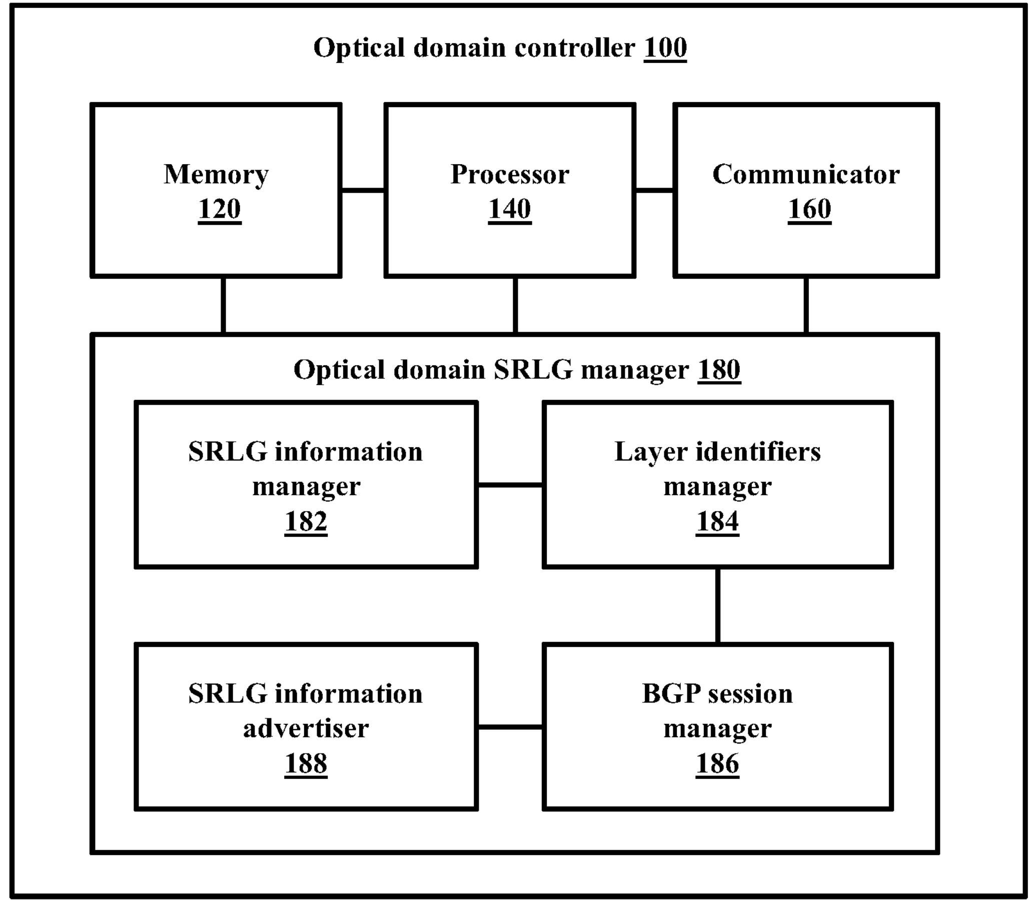
FIG. 3A is a block diagram of an optical domain controller for automatically advertising the SRLG information between multiple layers of a communication network, according to an embodiment disclosed herein.

FIG. 3A is a block diagram of an optical domain controller (100) for automatically advertising the SRLG information between multiple layers of the communication network, according to an embodiment disclosed herein. In an embodiment, the optical domain controller (100) includes a memory (120), a processor (140), a communicator (160) and an optical domain SRLG manager (180).

The memory (120) is configured to store SRLG information associated with an optical domain and SRLG information associated with IP domain. The memory (120) is also configured to store layer identifiers which are determined by the optical domain controller (100). Further, the memory (120) also stores instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160), and the Optical domain SRLG manager (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the optical domain controller (100) and with external devices via one or more networks.

In an embodiment, the Optical domain SRLG manager (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The Optical domain SRLG manager (180) includes a SRLG information manager (182), a layer identifiers manager (184), a BGP session manager (186) and a SRLG information advertiser (188).

In an embodiment, the SRLG information manager (182) is configured to determine SRLG information associated with an optical domain and SRLG information associated with IP domain to be shared with an IP domain controller (200). The SRLG information associated with the optical domain includes a SRLG number associated with the optical domain, information of UNI interfaces. The SRLG information associated with the IP domain includes information associated with IP domain router interface, router identifier (ID) discovered using a neighbor exchange protocol, link aggregation, virtual local area network identifier (VLAN ID) and VLAN details.

In an embodiment, the layer identifiers manager (184) is configured to determine layer identifiers to establish a multi-protocol enabled Border Gateway Protocol (BGP) session between the optical domain and the IP domain. The layer identifiers indicate the advertising of the SRLG information associated with the optical domain and the SRLG information associated with the IP domain. The layer identifiers are for example but not limited to Address Family Identifiers (AFI) and Subsequent Address Family Identifiers (SAFI).

In an embodiment, the BGP session manager (186) is configured to send a request to the IP domain controller (200) for establishing the multi-protocol enabled BGP session between the optical domain controller (100) and the IP domain controller (200) and receive a response from the IP domain controller (200), accepting the establishment of the multi-protocol enabled BGP session between the optical domain controller (100) and the IP domain controller (200). The request includes the layer identifiers. The BGP session manager (186) is configured to exchange capabilities associated with the multi-protocol enabled BGP session with the IP domain controller (200) and establish the multi-protocol enabled BGP session between the optical domain controller (100) and the IP domain controller (200).

In an embodiment, the SRLG information advertiser (188) is configured to advertise the SRLG information associated with the optical domain and the SRLG information associated with the IP domain to the IP domain controller (200) over the established multi-protocol enabled BGP session.

At least one of the plurality of modules/components of the Optical domain SRLG manager (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 3A shows various hardware components of the optical domain controller (100), but it is to be understood that other embodiments are not limited thereon. In other embodiments, the optical domain controller (100) may include less or a greater number of components. Further, the labels or names of the components are used only for illustrative purpose and does not limit the scope of the invention. One or more components can be combined to perform same or substantially similar function to managing application logs based on various events.

Figure 3B:
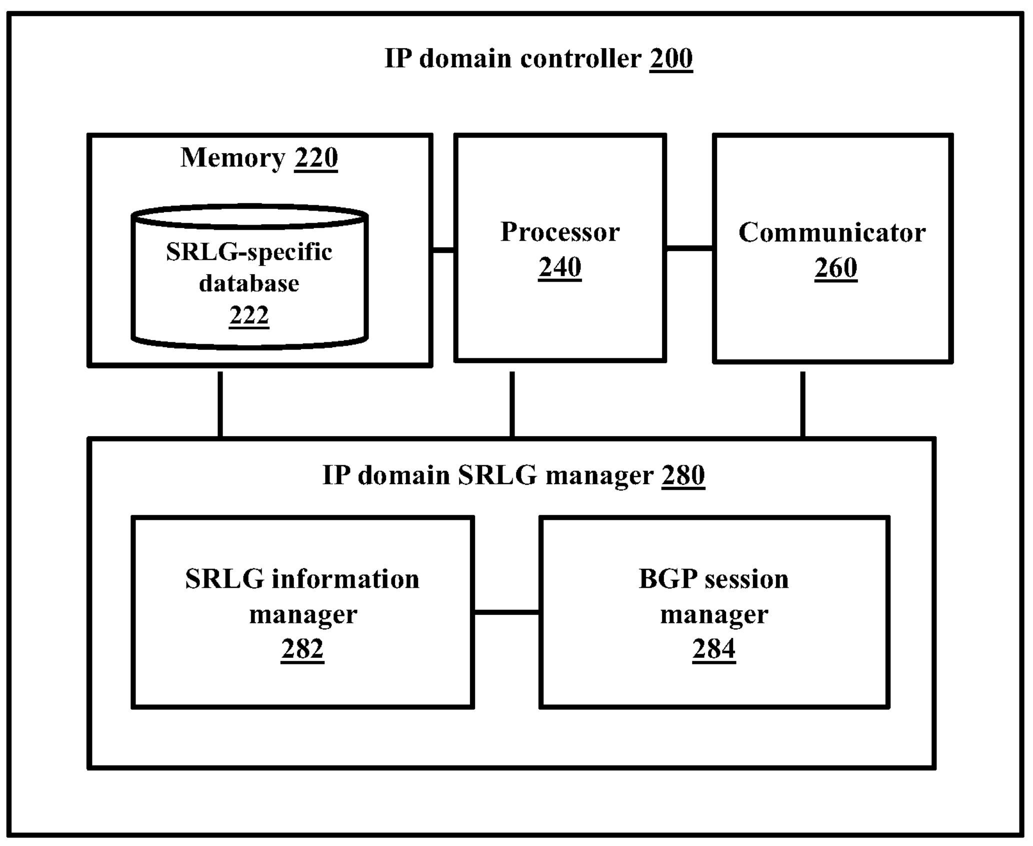
FIG. 3B is a block diagram of an IP domain controller for communicating with the optical domain controller to automatically receive the SRLG, according to an embodiment disclosed herein.

FIG. 3B is a block diagram of the IP domain controller (200) for communicating with the optical domain controller to automatically receive the SRLG, according to an embodiment disclosed herein. In an embodiment, the IP domain controller (200) includes a memory (220), a processor (240), a communicator (260) and an IP domain SRLG manager (280).

The memory (220) is configured to store SRLG information associated with an optical domain and SRLG information associated with IP domain received from the optical domain controller (100). The memory (220) is also configured to store layer identifiers. Further, the memory (220) also stores instructions to be executed by the processor (240). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information. In certain examples, a non-transitory storage medium may store data that can, over time, change (e.g., in Random Access Memory (RAM) or cache).

The processor (240) communicates with the memory (220), the communicator (260), and the IP domain SRLG manager (280). The processor (140) is configured to execute instructions stored in the memory (220) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (260) includes an electronic circuit specific to a standard that enables wired or wireless communication. The communicator (260) is configured to communicate internally between internal hardware components of the IP domain controller (200) and with external devices via one or more networks.

In an embodiment, the IP domain SRLG manager (280) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The IP domain SRLG manager (280) includes a SRLG information manager (282) and a BGP session manager (284).

In an embodiment, the SRLG information manager (282) is configured to receive the request from the IP domain controller (200) for establishing the multi-protocol enabled BGP session between the optical domain controller (100) and the IP domain controller (200).

In an embodiment, the BGP session manager (284) is configured to receive a request including the layer identifiers from the optical domain controller (100) for establishing the multi-protocol enabled BGP session between the optical domain controller (100) and the IP domain controller (200) and send the response accepting the establishment of the multi-protocol enabled BGP session between the optical domain controller (100) and the IP domain controller (200). Further, the BGP session manager (284) is configured to exchange capabilities associated with the multi-protocol enabled BGP session with the optical domain controller (100) and accept the multi-protocol enabled BGP session between the optical domain controller (100) and the IP domain controller (200). The BGP session manager (284) is configured to receive the SRLG information associated with the optical domain and SRLG information associated with the IP domain from the optical domain controller (100) over the established multi-protocol enabled BGP session.

The SRLG information manager (282) is also configured to create a SRLG-specific database locally and store the received SRLG information associated with the optical domain and the SRLG information associated with the IP domain in the SRLG-specific database. Further, the SRLG information manager (282) is also configured to perform at least one of a path computation and a path updation using the SRLG information associated with the optical domain and the SRLG information associated with the IP domain stored in the SRLG-specific database.

At least one of the plurality of modules/components of the IP domain SRLG manager (280) may be implemented through an AI model. A function associated with the AI model may be performed through memory (220) and the processor (240). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 3B shows various hardware components of the IP domain controller (200), but it is to be understood that other embodiments are not limited thereon. In other embodiments, the IP domain controller (200) may include less or a greater number of components. Further, the labels or names of the components are used only for illustrative purpose and does not limit the scope of the invention. One or more components can be combined to perform same or substantially similar function to managing application logs based on various events.

Figure 4:
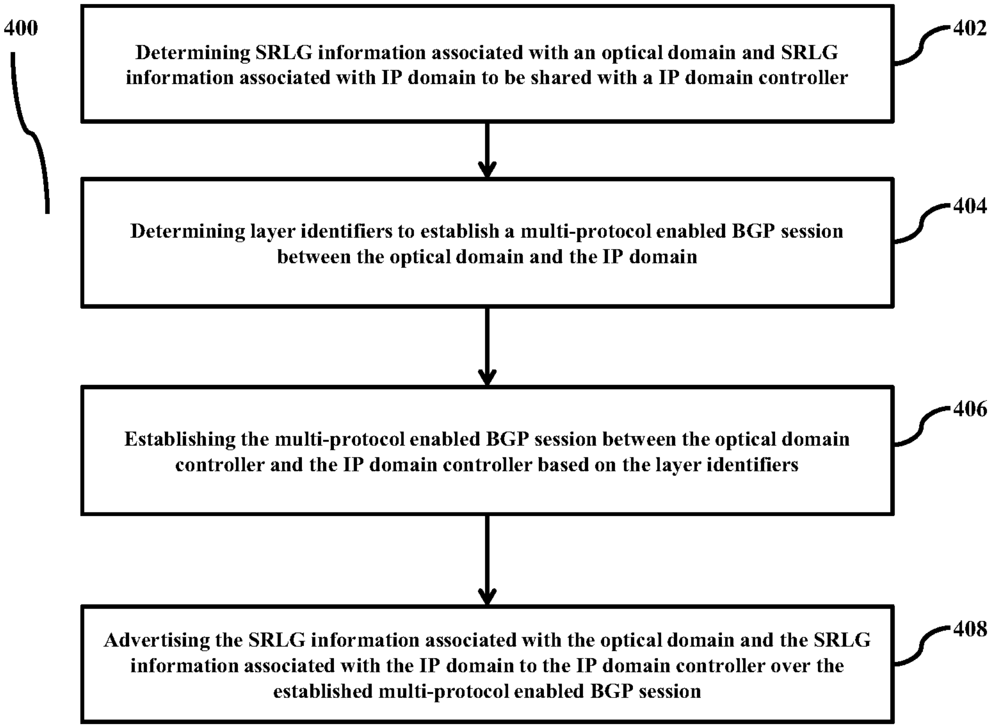
FIG. 4 is a flow chart illustrating a method for automatically advertising the SRLG information between the multiple layers of the communication network, according to an embodiment disclosed herein.

FIG. 4 is a flow chart (400) illustrating a method for automatically advertising the SRLG information between the multiple layers of the communication network, according to an embodiment disclosed herein.

Referring to the FIG. 4, at step 402, the method includes the optical domain controller (100) determining the SRLG information associated with the optical domain and the SRLG information associated with the IP domain to be shared with the IP domain controller (200). For example, in the optical domain controller (100) as illustrated in the FIG. 3A, the Optical domain SRLG manager (180) is configured to determine the SRLG information associated with the optical domain and the SRLG information associated with the IP domain to be shared with the IP domain controller (200).

At step 404, the method includes the optical domain controller (100) determining layer identifiers to establish the multi-protocol enabled BGP session between the optical domain and the IP domain. For example, in the optical domain controller (100) as illustrated in the FIG. 3A, the Optical domain SRLG manager (180) is configured to determine layer identifiers to establish the multi-protocol enabled BGP session between the optical domain and the IP domain.

At step 406, the method includes the optical domain controller (100) establishing the multi-protocol enabled BGP session between the optical domain controller (100) and the IP domain controller (200) based on the layer identifiers. For example, in the optical domain controller (100) as illustrated in the FIG. 3A, the Optical domain SRLG manager (180) is configured to establish the multi-protocol enabled BGP session between the optical domain controller (100) and the IP domain controller (200) based on the layer identifiers.

At step 408, the method includes the optical domain controller (100) advertising the SRLG information associated with the optical domain and the SRLG information associated with the IP domain to the IP domain controller (200) over the established multi-protocol enabled BGP session. For example, in the optical domain controller (100) as illustrated in the FIG. 3A, the Optical domain SRLG manager (180) is configured to advertise the SRLG information associated with the optical domain and the SRLG information associated with the IP domain to the IP domain controller (200) over the established multi-protocol enabled BGP session.

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
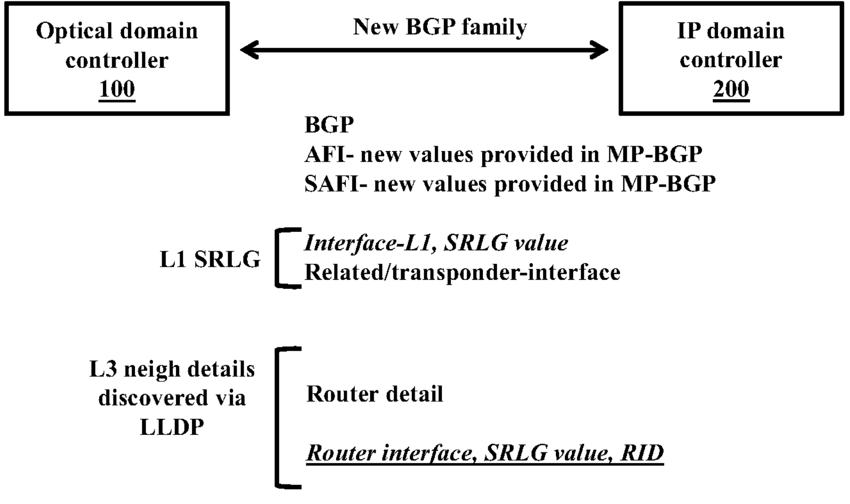
FIG. 5 illustrates BGP extensions to carry the SRLG information between the optical domain controller and the IP domain controller, according to an embodiment disclosed herein.

FIG. 5 illustrates BGP extensions to carry the SRLG information between the optical domain controller (100) and the IP domain controller (200), according to an embodiment disclosed herein.

Referring to the FIG. 5, dedicated controllers in the respective domains of the transport domain include the optical domain controller (100) and the IP domain controller (200). In the proposed method, an existing multi-protocol enabled Border Gateway Protocol (BGP) session is modified and utilized for automatic detection and communication of the SRLG information between the optical domain controller (100) and the IP domain controller (200) i.e., to carry the SRLG information from (L0/L1) to (L3) layers.

The optical domain controller (100) which holds the SRLG information associated with the optical domain as well as the associated with the IP domain. Further, the optical domain controller (100) also uses a Link Layer Discovery Protocol (LLDP) protocol (Ethertype—0x88cc) to acquire details such as connections between transponders and Layer 3 routers, etc. by virtue of which the optical domain controller (100) transfers the SRLG information associated with the IP domain.

The SRLG information associated with the optical domain includes but may not be limited to a SRLG number associated with the optical domain, information of UNI interfaces. The information received from the LLDP includes but may not be limited to information associated with IP domain router interface, router identifier (ID) (Management address) discovered using a neighbour exchange protocol, link aggregation, virtual local area network identifier (VLAN ID) and VLAN details which provides relevant information about connected IP network. The BGP protocol can use the information pertinent to advertise the SRLG information for both the layers.

Figure 6:
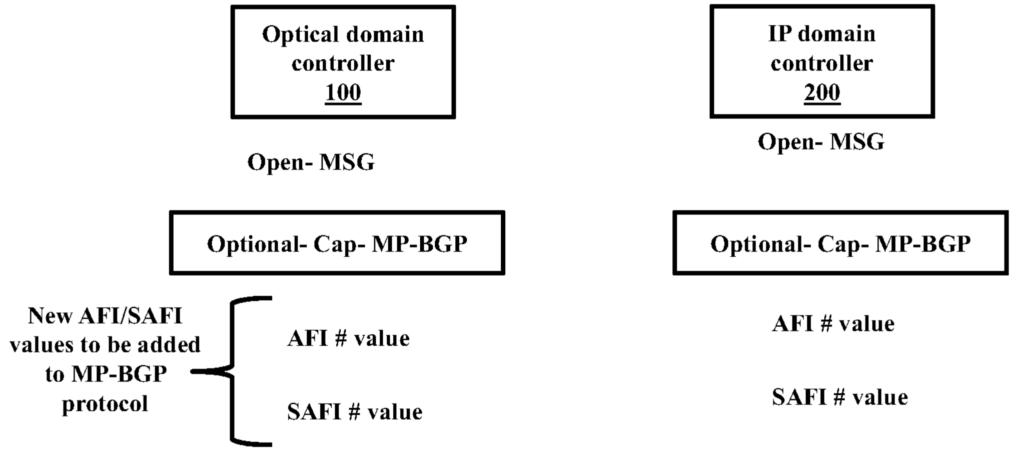
FIG. 6 illustrates BGP capability negotiation between the optical domain controller and the IP domain controller, according to an embodiment disclosed herein.

FIG. 6 illustrates BGP capability negotiation between the optical domain controller and the IP domain controller, according to an embodiment disclosed herein.

Figure 7:
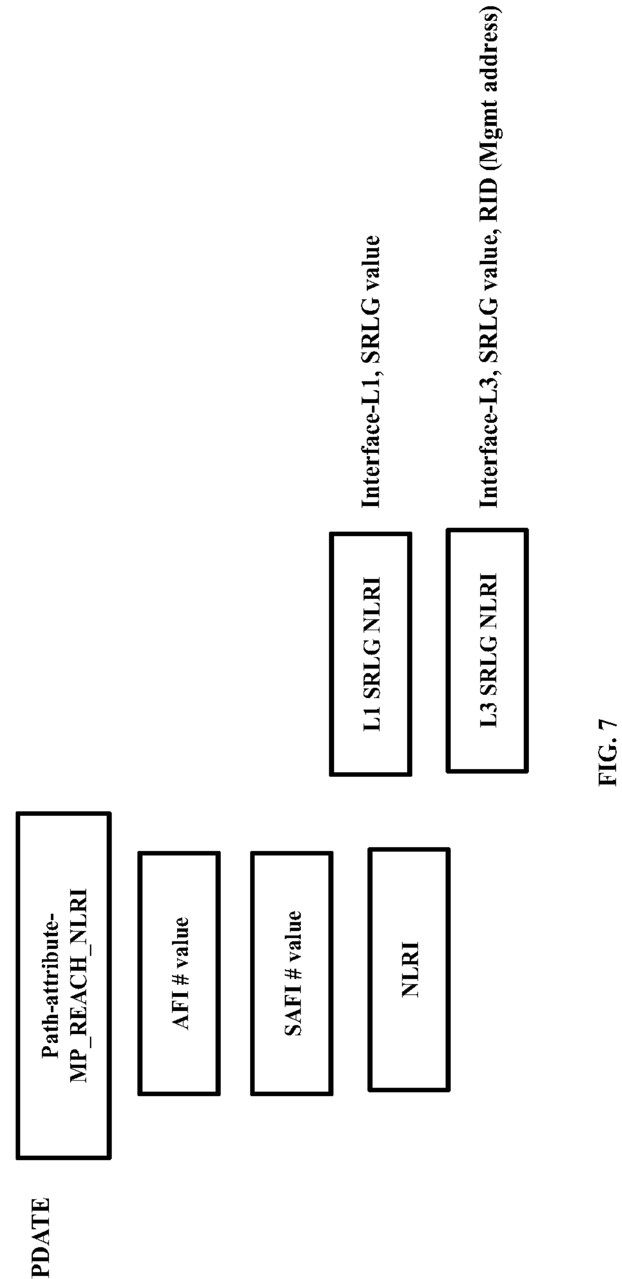
FIG. 7 illustrates BGP NLRI encodings for route advertisements between the optical domain controller and the IP domain controller, according to an embodiment disclosed herein.

FIG. 7 illustrates BGP NLRI encodings for route advertisements between the optical domain controller and the IP domain controller, according to an embodiment disclosed herein.

Referring to the FIG. 6, when the BGP session is formed, initially the optical domain controller (100) and the IP domain controller (200) exchange capabilities. In the proposed method the multi-protocol BGP protocol is modified to include the layer identifiers indicating the SRLG specific purpose. The layer identifiers can be for example but not limited to the AFI and the SAFI in the existing multi-protocol BGP.

As the IP domain controller (200) receives the MP BGP protocol request, the IP domain controller (200) will be able to determine that the information shared is the SRLG information. Therefore, the IP domain controller (200) need not get the SRLG information from the L3 layer, as the IP domain controller (200) is receiving the SRLG information directly from the optical domain controller (100). The IP domain controller (200) can automatically consider the SRLG information shared by the optical domain controller (100) for path computation.

At step 1 of the MP BGP session establishment, initial Session Negotiation is performed. This includes exchange as mentioned below in the BGP protocol:

1. L1 SRLG information which includes the SRLG number, UNI Interfaces.
2. L3 Router Interface details, Router-ID discovered using the neighbor exchange protocol (LLDP).

During the initial BGP session negotiation, the optical domain controller (100) and the IP domain controller (200) exchanges the multiprotocol capability as part of OPEN message and indicate that the optical domain controller (100) and the IP domain controller (200) want to exchange the SRLG information. The extensions are indicated in the FIG. 6.

At step 2, as the optical domain controller (100) and the IP domain controller (200) agree on the multiprotocol capability, the optical domain controller (100) sends the BGP updates for the SRLG information. The IP domain controller (200) on receiving the SRLG information from the optical domain controller (100) creates the SRLG-specific database locally. As a result, the IP domain controller (200) will not depend on the SRLG information coming from the IP layer. All further path computations/path updations can use the SRLG-specific information available to compute the required disjoint paths in the transport domain. Any new SRLG addition in the network will seamlessly be available to the IP domain controller (200). Hence, the optical domain controller (100) avoids the repetition of configuring and advertising the SRLG information from the IP layer and thus simplifies the deployment.

Figure 8:
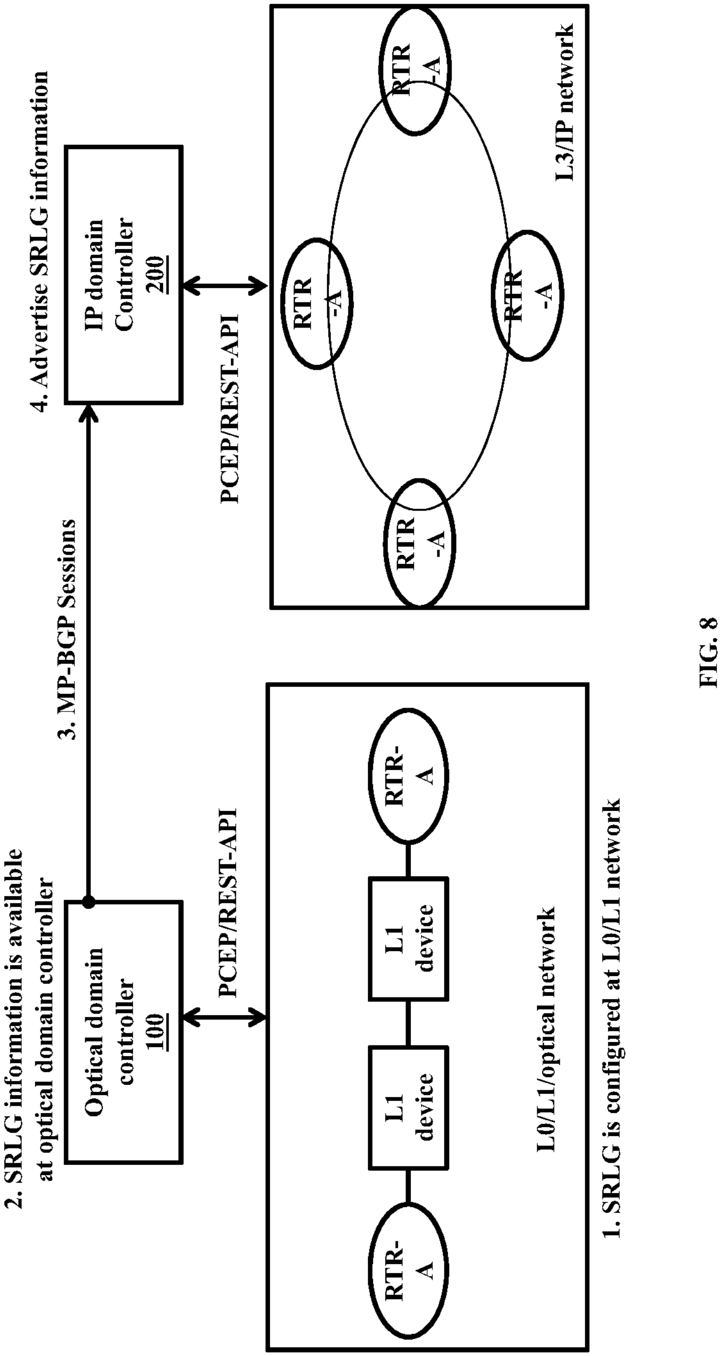
FIG. 8 illustrates the automatic exchange of the SRLG information between the optical domain controller and the IP domain controller over a BGP session, according to an embodiment disclosed herein.

FIG. 8 illustrates the automatic exchange of the SRLG information between the optical domain controller (100) and the IP domain controller (200) over the BGP session, according to an embodiment disclosed herein. Referring to the FIG. 8, at step 1, the SRLG is configured at the L0/L1 network. At step 2, the SRLG information is available at the optical domain controller (100) or any element capable of BGP signalling and provides seamless BGP NLRI advertisements. At step 3, the MP-BGP Session is established between the optical domain controller (100) and the IP domain controller (200). At step 4, the SRLG information is advertised over the established MP-BGP Session. Thus the proposed method eliminates manual intervention in the SRLG advertising procedure. Thereby making the SRLG advertising procedure tamper proof, error proof and also seamless synchronization.

The following terminologies are used throughout the specification:

SRLG: Shared Risk Link Group

L0/L1: Layer 0 and Layer 1 denotes optical layer.

L3: IP layer

L1 Controller: Path computation engine in the Optical layer.

L3 Controller: Path computation engine in the IP layer.

PCEP: Path computation engine

BGP-LS: BGP Link state protocol for exporting transport network topology.

Disjoint Paths: A method of providing different paths, different routers, and resources for the 2 set of services subscribed by customers.

LLDP: Link layer discovery protocol

AFI: Address Family Identifiers

SAFI: Subsequent Address Family Identifiers

RTR: Router

NLRI: Network layer reachability information

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for advertising Shared Risk Link Group (SRLG) information between multiple layers of a communication network, wherein the method comprises:

determining, by an optical domain controller (100), SRLG information associated with an optical domain and SRLG information associated with IP domain to be shared with a IP domain controller (200);

determining, by the optical domain controller (100), layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain;

establishing, by the optical domain controller (100), the multi-protocol enabled BGP session between the optical domain controller (100) and the IP domain controller (200) based on the layer identifiers; and advertising, by the optical domain controller (100), the SRLG information associated with the optical domain and the SRLG information associated with the IP domain to the IP domain controller (200) over the established multi-protocol enabled BGP session.

2. The method as claimed in claim 1, further comprising:

receiving, by the IP domain controller (200), the SRLG information associated with the optical domain and the SRLG information associated with the IP domain over the established multi-protocol enabled BGP session;

creating, by the IP domain controller (200), a SRLG-specific database locally;

storing, by the IP domain controller (200), the received SRLG information associated with the optical domain and the SRLG information associated with the IP domain in the SRLG-specific database; and performing, by the IP domain controller (200), at least one of a path computation and a path updation using at least one of the SRLG information associated with the optical domain and the SRLG information associated with the IP domain stored in the SRLG-specific database.

3. The method as claimed in claim 1, wherein establishing, by the optical domain controller (100), the multi-protocol enabled BGP session between the optical domain controller (100) and the IP domain controller (200) based on the layer identifiers comprises:

sending, by the optical domain controller (100), a request comprising the layer identifiers, to the IP domain controller (200) for establishing the multi-protocol enabled BGP session between the optical domain controller (100) and the IP domain controller (200);

receiving, by the optical domain controller (100), a response accepting the establishment of the multi-protocol enabled BGP session between the optical domain controller (100) and the IP domain controller (200);

exchanging, by the optical domain controller (100), capabilities associated with the multi-protocol enabled BGP session with the IP domain controller (200); and establishing, by the optical domain controller (100), the multi-protocol enabled BGP session between the optical domain controller (100) and the IP domain controller (200).

4. The method as claimed in claim 1, wherein the SRLG information associated with the optical domain comprises at least one of a SRLG number associated with the optical domain, and information of UNI interfaces.

5. The method as claimed in claim 1, wherein the SRLG information associated with the IP domain comprises information associated with IP domain router interface, router identifier (ID) discovered using a neighbour exchange protocol, link aggregation, virtual local area network identifier (VLAN ID) and VLAN details.

6. The method as claimed in claim 1, wherein the layer identifiers is at least one of Address Family Identifiers (AFI) and Subsequent Address Family Identifiers (SAFI).

7. A system for advertising Shared Risk Link Group (SRLG) information between multiple layers of a communication network, wherein the system comprises:

an optical domain controller (100) for an optical domain and an IP domain controller (200) for an IP domain;

wherein the optical domain controller (100) is configured to:

determine SRLG information associated with an optical domain and SRLG information associated with IP domain to be shared with the IP domain controller (200);

determine layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain;

establish the multi-protocol enabled BGP session between the optical domain controller (100) and the IP domain controller (200) based on the layer identifiers; and advertise the SRLG information associated with the optical domain and the SRLG information associated with the IP domain to the IP domain controller (200) over the established multi-protocol enabled BGP session.

8. The system as claimed in claim 7, wherein the optical domain controller (100) is further configured to:

receive the SRLG information associated with the optical domain and the SRLG information associated with the IP domain over the established multi-protocol enabled BGP session;

create a SRLG-specific database locally;

store the received SRLG information associated with the optical domain and the SRLG information associated with the IP domain in the SRLG-specific database; and perform at least one of a path computation and a path updation using at least one of the SRLG information associated with the optical domain and the SRLG information associated with the IP domain stored in the SRLG-specific database.

9. The system as claimed in claim 7, wherein the optical domain controller (100) being configured to establish the multi-protocol enabled BGP session between the optical domain controller (100) and the IP domain controller (200) based on the layer identifiers comprises:

sending a request comprising the layer identifiers, to the IP domain controller (200) for establishing the multi-protocol enabled BGP session between the optical domain controller (100) and the IP domain controller (200);

receiving a response accepting the establishment of the multi-protocol enabled BGP session between the optical domain controller (100) and the IP domain controller (200);

exchanging capabilities associated with the multi-protocol enabled BGP session with the IP domain controller (200); and establishing the multi-protocol enabled BGP session between the optical domain controller (100) and the IP domain controller (200).

10. The system as claimed in claim 7, wherein the SRLG information associated with the optical domain comprises at least one of a SRLG number associated with the optical domain, and information of UNI interfaces.

11. The system as claimed in claim 7, wherein the SRLG information associated with the IP domain comprises information associated with IP domain router interface, router identifier (ID) discovered using a neighbour exchange protocol, link aggregation, virtual local area network identifier (VLAN ID) and VLAN details.

12. The system as claimed in claim 7, wherein the layer identifiers is at least one of Address Family Identifiers (AFI) and Subsequent Address Family Identifiers (SAFI).

13. An optical domain controller (100) for advertising Shared Risk Link Group (SRLG) information between multiple layers of a communication network, wherein the optical domain controller (100) comprises:

a memory (120);

a processor (140) coupled to the memory (120);

a communicator (160) coupled to the memory (120) and the processor (140);

an Optical domain SRLG manager (180) coupled to the memory (120), the processor (140) and the communicator (160), and wherein the Optical domain SRLG manager (180) is configured to:

determine SRLG information associated with an optical domain and SRLG information associated with IP domain to be shared with an IP domain controller (200);

determine layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain;

establish the multi-protocol enabled BGP session between the optical domain controller (100) and the IP domain controller (200) based on the layer identifiers; and advertise the SRLG information associated with the optical domain and the SRLG information associated with the IP domain to the IP domain controller (200) over the established multi-protocol enabled BGP session.

14. The optical domain controller (100) as claimed in claim 13, wherein the optical domain SRLG manager (180) being configured to establish the multi-protocol enabled BGP session between the optical domain controller (100) and the IP domain controller (200) based on the layer identifiers comprises:

sending a request comprising the layer identifiers, to the IP domain controller (200) for establishing the multi-protocol enabled BGP session between the optical domain controller (100) and the IP domain controller (200);

receiving a response accepting the establishment of the multi-protocol enabled BGP session between the optical domain controller (100) and the IP domain controller (200);

exchanging capabilities associated with the multi-protocol enabled BGP session with the IP domain controller (200); and establishing the multi-protocol enabled BGP session between the optical domain controller (100) and the IP domain controller (200).

15. The optical domain controller (100) as claimed in claim 13, wherein the SRLG information associated with the optical domain comprises at least one of a SRLG number associated with the optical domain, and information of UNI interfaces.

16. The optical domain controller (100) as claimed in claim 13, wherein the SRLG information associated with the IP domain comprises information associated with IP domain router interface, router identifier (ID) discovered using a neighbour exchange protocol, link aggregation, virtual local area network identifier (VLAN ID) and VLAN details.

17. The optical domain controller (100) as claimed in claim 13, wherein the layer identifiers is at least one of Address Family Identifiers (AFI) and Subsequent Address Family Identifiers (SAFI).

18. A Computer Program Product (CPP) for advertising Shared Risk Link Group (SRLG) information between multiple layers of a communication network, wherein the CPP comprises:

a computer executable program code recorded on a computer readable non-transitory storage medium, wherein said computer executable program code when executed causing the actions including:

determining SRLG information associated with an optical domain and SRLG information associated with IP domain to be shared with an IP domain controller (200);

determining layer identifiers to establish a multi-protocol enabled Border Gateway Protocol (BGP) session between the optical domain and the IP domain, wherein the layer identifiers indicate the advertising of the SRLG information associated with the optical domain and the SRLG information associated with the IP domain;

establishing the multi-protocol enabled BGP session between the optical domain controller (100) and the IP domain controller (200) based on the layer identifiers; and advertising the SRLG information associated with the optical domain and the SRLG information associated with the IP domain to the IP domain controller (200) over the established multi-protocol enabled BGP session.

19. The CPP as claimed in claim 18, wherein the actions further include:

receiving the SRLG information associated with the optical domain and the SRLG information associated with the IP domain over the established multi-protocol enabled BGP session;

creating a SRLG-specific database locally;

storing the received SRLG information associated with the optical domain and the SRLG information associated with the IP domain in the SRLG-specific database; and performing at least one of a path computation and a path updation using at least one of the SRLG information associated with the optical domain and the SRLG information associated with the IP domain stored in the SRLG-specific database.

20. The CPP as claimed in claim 18, wherein establishing the multi-protocol enabled BGP session between the optical domain controller (100) and the IP domain controller (200) based on the layer identifiers comprises:

sending a request comprising the layer identifiers, to the IP domain controller (200) for establishing the multi-protocol enabled BGP session between the optical domain controller (100) and the IP domain controller (200);

receiving a response accepting the establishment of the multi-protocol enabled BGP session between the optical domain controller (100) and the IP domain controller (200);

exchanging capabilities associated with the multi-protocol enabled BGP session with the IP domain controller (200); and establishing the multi-protocol enabled BGP session between the optical domain controller (100) and the IP domain controller (200).

21. The CPP as claimed in claim 18, wherein the SRLG information associated with the optical domain comprises at least one of a SRLG number associated with the optical domain, and information of UNI interfaces.

22. The CPP as claimed in claim 18, wherein the SRLG information associated with the IP domain comprises information associated with IP domain router interface, router identifier (ID) discovered using a neighbour exchange protocol, link aggregation, virtual local area network identifier (VLAN ID) and VLAN details.

23. The CPP as claimed in claim 18, wherein the layer identifiers is at least one of Address Family Identifiers (AFI) and Subsequent Address Family Identifiers (SAFI).

* * * * *